US007403951B2

(12) United States Patent
Setlur et al.

(10) Patent No.: US 7,403,951 B2
(45) Date of Patent: Jul. 22, 2008

(54) SYSTEM AND METHOD FOR MEASURING SVG DOCUMENT SIMILARITY

(75) Inventors: Vidya Setlur, Irving, TX (US); Michael Ingrassia, Dallas, TX (US); Suresh Chitturi, Irving, TX (US); Tolga Capin, Fort Worth, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/245,859

(22) Filed: Oct. 7, 2005

(65) Prior Publication Data

US 2007/0083808 A1 Apr. 12, 2007

(51) Int. Cl.
*G06F 7/00* (2006.01)
*G06F 17/00* (2006.01)
(52) U.S. Cl. .................................. 707/101; 707/100
(58) Field of Classification Search .................. 707/3, 707/100, 101
See application file for complete search history.

(56) References Cited

U.S. PATENT DOCUMENTS

| 2002/0073080 A1* | 6/2002 | Lipkin ........................... 707/3 |
| 2003/0050931 A1* | 3/2003 | Harman et al. ............... 707/100 |
| 2004/0004619 A1* | 1/2004 | Capin et al. .................. 345/473 |
| 2005/0038785 A1 | 2/2005 | Agrawal et al. |
| 2005/0182778 A1 | 8/2005 | Heuer et al. |

OTHER PUBLICATIONS

Nokia Position Paper: W3C Workshop on Binary Interchange of XML Information Iten Sets, Aug. 2003 4 pages.*
Minimizing SVG File Sizez- SVG 1.1 Jan. 14, 2003 Appendix J: Minimizing SVG File Sizes 2 pages.*
SVG 1.2 "Steaming" Oct. 27, 2004 2 pages.*
Mobile SVG Profiles: SVG Tiny and SVG Basic Jan. 14, 2003 82 pages.*
Change Detection in Hierarchically Structured Information, Chawathe et al., SIGMOD Jun. 1996, pp. 493-504.
A matching algorithm for measuring the structural similarity between an XML document and a DTD and its application, Bertino et al., Elsevier Science Ltd., 2003, pp. 23-46.
Fast Detection of XML Structural Similarity, Fiesca et al., IEEE Transactions on Knowledge and Data Engineering, vol. 17., No. 2, Feb. 2005, pp. 160-175.
A Extensible Compressor for XML Data, Liefke et al., SIGMOD Record, vol. 29, No. 1, Mar. 2000, pp. 57-62.
Evaluating Structural Similarity in XML Documents, Nierman et al., University of Michigan, 6 pages.
XMill: an Efficient Compressor for XML Data, Liefke et al., ACM 2000, pp. 153-164.
Supporting Efficient Query Processing on Compressed XML Files, Lin et al., 2005 ACM Symposium on Applied Computing, pp. 660-665.

* cited by examiner

*Primary Examiner*—Sam Rimell
*Assistant Examiner*—Cory C Bell
(74) *Attorney, Agent, or Firm*—Foley & Lardner LLP

(57) ABSTRACT

A system and method for measuring the similarity between SVG documents. The present invention involves reducing the respective documents to their minimal logical representations and then analyzing the representations using tree isomorphism techniques. Applications can then use this comparison data to more efficiently perform actions such as content compression, content streaming and content searching.

22 Claims, 16 Drawing Sheets

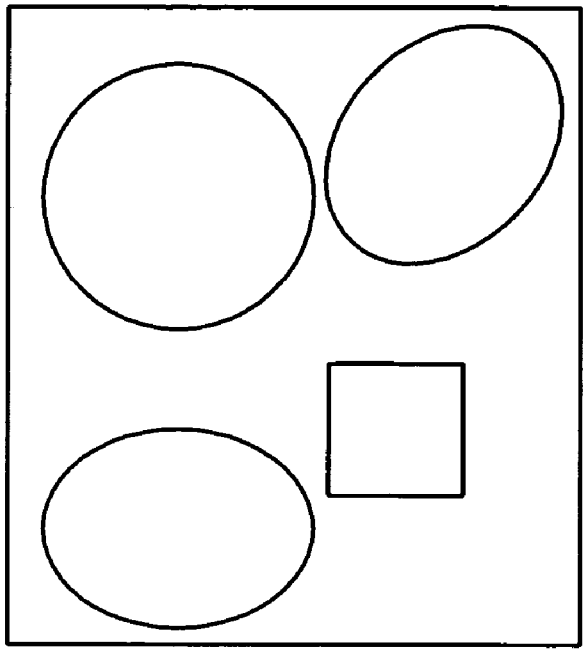

```
<svg viewBox="0 0 1000 1000" version="1.1">
    <defs>
        <circle id="s1" cx="200" cy="200" r="200" stroke="black" stroke-width="3" />
        <ellipse id="s2" cx="200" cy="150" rx="200" ry="150" stroke="black" stroke-width="3" />
        <rect id="s3" width="200" height="200" stroke="black" stroke-width="3" />
    </defs>

<use x="100" y="100" fill="mediumorchid" xlink:href="#s1" />
    <use x="100" y="650" fill="lightskyblue" xlink:href="#s2" />
    <use x="520" y="550" fill="tomato" xlink:href="#s3" />
    <use x="230" y="450" transform="rotate(-45, 100, 100)" fill="mediumseagreen" xlink:href="#s2" />
</svg>
```

FIG. 1a

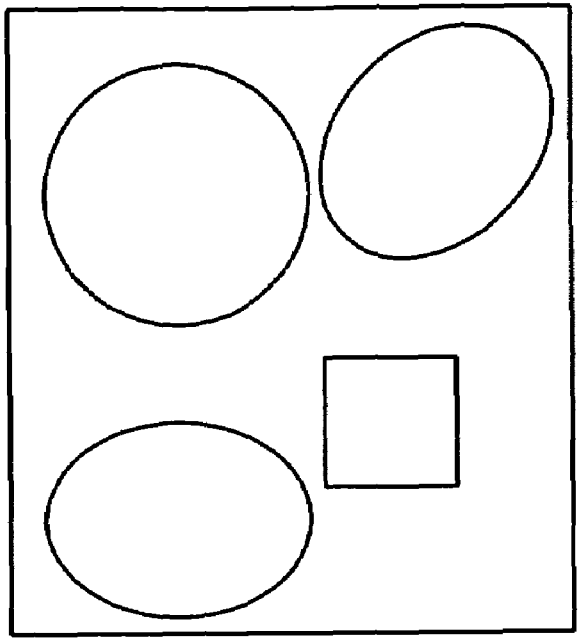

```
<svg viewBox="0 0 1000 1000" version=
"1.1">
    <circle id="s1" cx="300" cy="300" r=
"200" fill="mediumorchid" stroke="black"
stroke-width="3" />

<ellipse id="s2" cx="350" cy="800" rx=
"200" ry="150" fill="lightskyblue" stroke=
"black" stroke-width="3" />

<rect id="s3" x="770" y="750" width="200"
height="200" stroke="black" stroke-width=
"3"/>

<ellipse id="s4" cx="430" cy="600" rx=
"200" ry="150" transform="rotate(-
45, 100, 100)" fill="mediumseagreen" stroke=
"black" stroke-width="3" />
</svg>
```

FIG. 1b

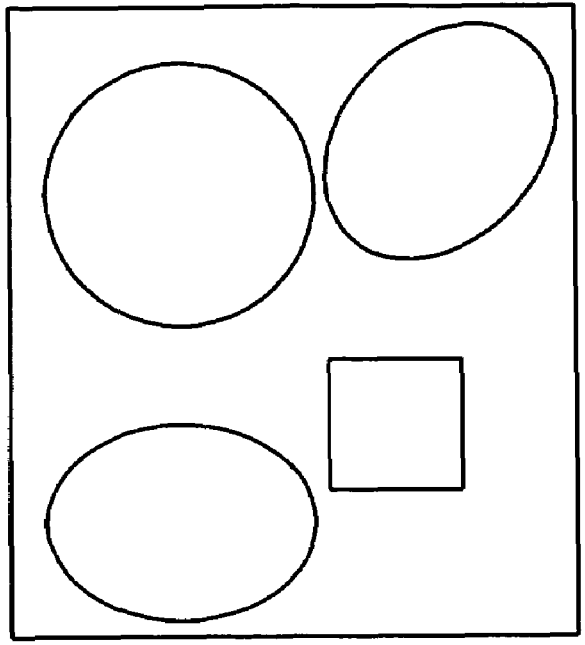

```
<svg viewBox="0 0 1000 1000" version="1.1">
    <defs>
        <circle id="s1" cx="200" cy="200" r="200" stroke="black" stroke-width="3"/>
        <ellipse id="s2" cx="200" cy="150" rx="200" ry="150" stroke="black" stroke-width="3"/>
        <rect id="s3" width="200" height="200" stroke="black" stroke-width="3"/>
    </defs>

<use x="100" y="100" fill="mediumorchid" xlink:href="#s1"/>
    <use x="100" y="650" fill="lightskyblue" xlink:href="#2"/>
    <use x="520" y="550" fill="tomato" xlink:href="#s3"/>
    <use x="230" y="450" transform="rotate(-45, 100, 100)" fill="mediumseagreen" xlink:href="#s2"/>
</svg>
```

FIG. 2a

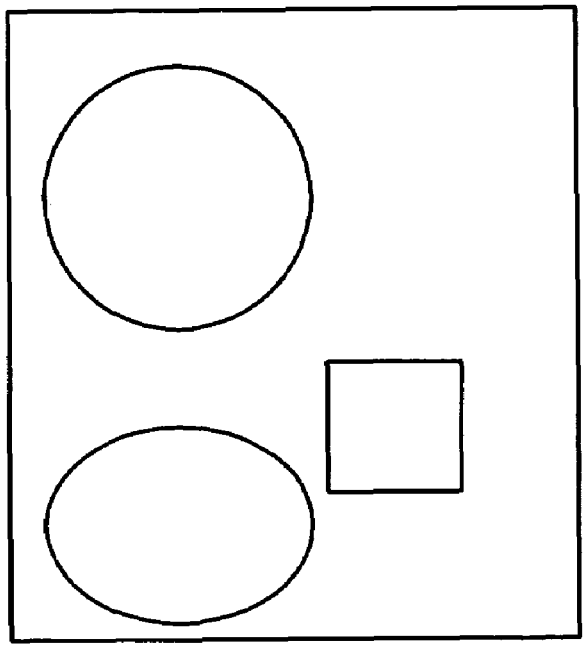

```
<svg viewBox="0 0 1000 1000" version=
"1.1">
    <circle id="s1" cx="300" cy="300" r=
"200" fill="mediumorchid" stroke="black"
stroke-width="3" />

<ellipse id="s2" cx="350" cy="800" rx=
"200" ry="150" fill="lightskyblue" stroke=
"black" stroke-width="3" />

<rect id="s3" x="770" y="750" width="200"
height="200" stroke="black" stroke-width=
"3" />

<ellipse id="s4" cx="430" cy="600" rx=
"200" ry="150" transform="rotate(-
45, 100, 100)" fill="mediumseagreen" stroke=
"black" stroke-width="3"
style="visibility:hidden" />
</svg>
```

FIG. 2b

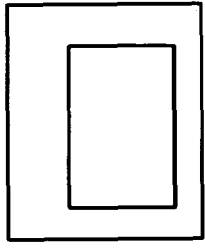

ANIMATION AT 2s

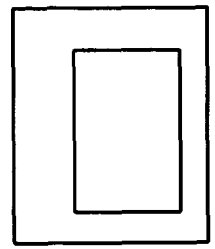

```
<svg xmlns="http://www.w3.org/2000/svg"
  xmlns:xlink="http://www.w3.org/1999/xlink"
  version="1.2">
<defs>
  <rect id="movieClip" x="-50" y="-50" width="100"
    height="100" fill="purple" stroke="black">
    <animate attributeName="fill"
      values="purple;yellow;purple" keyTimes="0;.5;1"
      begin="0" dur="2" fill=freeze" />
  </rect>
</defs>
<animation begin="2" x="100" y="300" width="100"
  height="100" xlink:href="#movieClip" />
</svg>
```

```
<svg xmlns="http://www.w3.org/2000/svg"
  xmlns:xlink="http://www.w3.org/1999/xlink"
  version="1.2">
<defs>
  <rect id="movieClip" x="-50" y="-50" width="100"
    height="100" fill="purple" stroke="black">
    <animate attributeName="fill"
      values="purple;yellow;purple" keyTimes="0;.5;1"
      begin="0" dur="2" fill=freeze" />
  </rect>
</defs>
<animation begin="1" dur="3" repeatCount="1.5"
  fill="freeze" x="100" y="100" width="100"
  height="100" xlink:href="#movieClip" />
</svg>
```

FIG. 4

Hello

```
<?xml version="1.0"?>
<svg width="100" height="100">
<!-- font definition omitted -->

<g style="font-family: Space Toaster;
          font-size:30pt; fill:black;
          filter:url(#shadow)">
  <text x="10" y"40"> Hello </text>
</g>
</svg>
```

Hello

```
<?xml version="1.0"?>
<svg width="100" height="100">
<!-- font definition omitted -->

<g style="font-family: Space Toaster;
          font-size:20pt; fill:black;">
  <text x="10" y"90"> Hello </text>
</g>
</svg>
```

FIG. 5

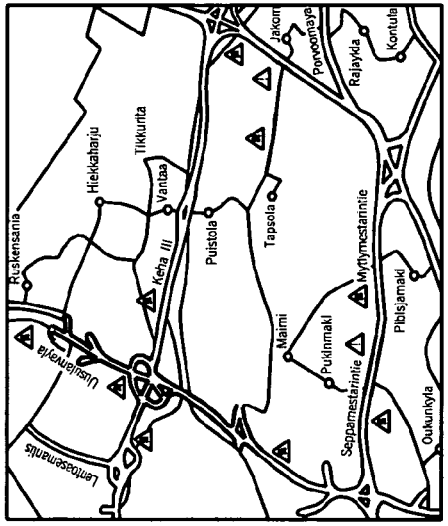

SVG DOCUMENT A

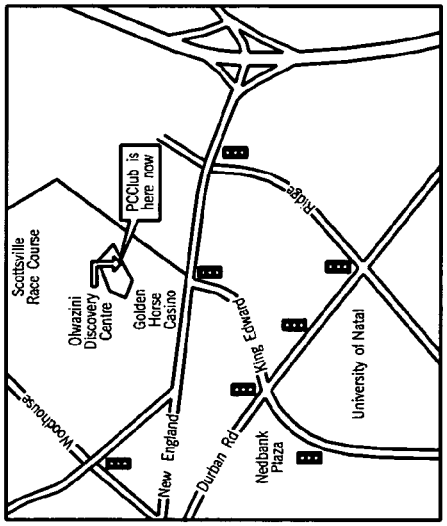

SVG DOCUMENT B

```
<svg>
......
 <g id="icons">
  <g id="icon_warning">
   <path style="fill:black;stroke:none;" d="M-1.3 0 Q -0.9 -0.7 -0.7 -0.7 -0.3 Q 0.2 -1.2 0.7 -0.3 Q 1
-0.7 1.3 0 z"/>
  <g style="fill:none;stroke:mediumblue;stroke-width:0.15;stroke-dasharray:0.4,0.2">
   <line id="icon_border" x1="0.2" y1="0.2" x2="-0.3" y2="1.5"/>
   <use x="-0.5" xlink:href="#rain" transform="scale(0.8)"/>
   <use x="0.5" xlink:href="#rain" transform="scale(0.8)"/>
  </g>
 </g>
......
</svg>
```

THE COMMON SVG CONTENT

FIG. 6

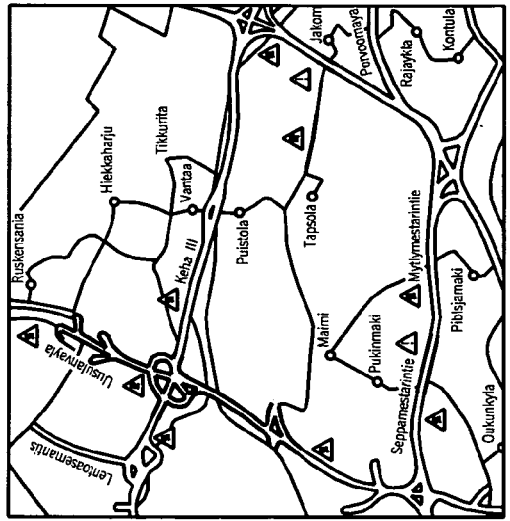
SVG DOCUMENT B
```
<svg>
......
<g id="icon1">
  <path fill="#FFFFFF" stroke="#808080" stroke-width="2" d="M417.291,327.381|4.543-7.869|4.543,7.869|4.543...." />
  <path fill="#FFFFFF" stroke="#FF3333" stroke-width="2" d="M415.291,325.381|4.543-7.869|4.543,7.869|4.543,7.869h..." />
</g>
......
</svg>
```
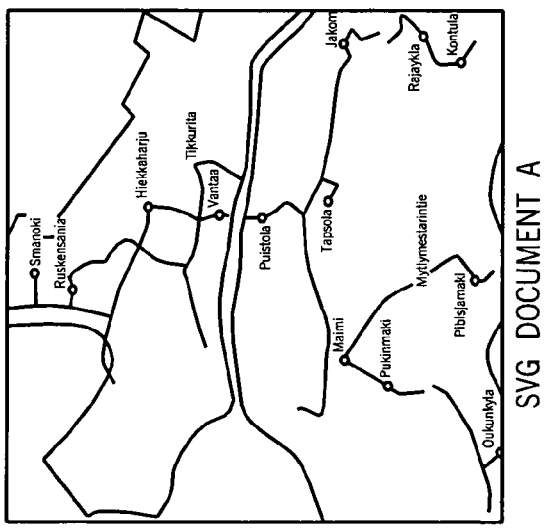
SVG DOCUMENT A
```
<svg>
......
<g id="icon1">
  <g fill="lightgray">
    <path id="cloud" style="stroke:black;stroke-width:0.05" d="M-1.6 0 Q -1.2 -v0.7 -0.9 -0.3 Q-0.1-1.5 0.4 -0.3 Q 0.7 -0.7 1 0 z" />
  </g>
......
</svg>
```
FIG. 7

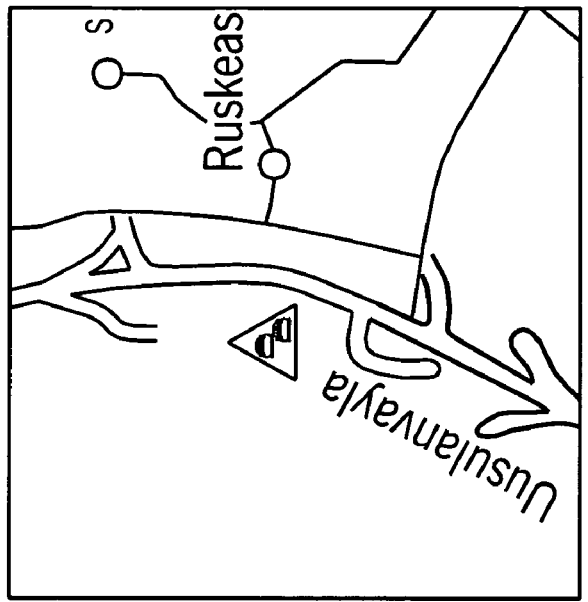
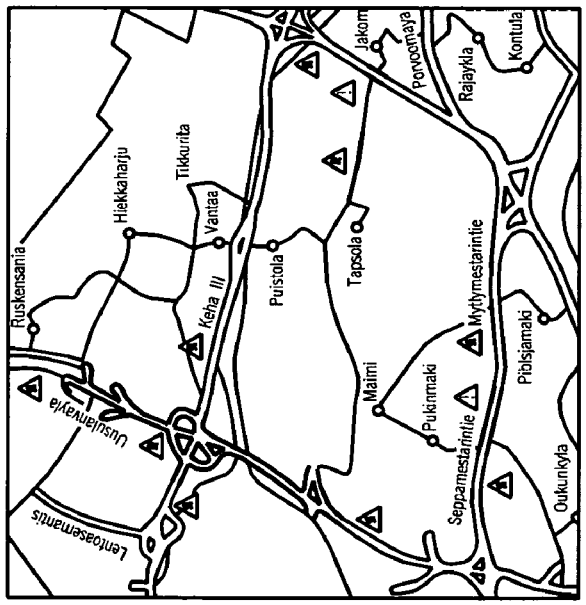
FIG. 8

```
<svg>
.....
<g id="icon1" importance="0.6" >
  <path fill="#FFFFFF" stroke="#808080"
    stroke-width="2"
    d="M417.291,327.381|4.543-
    7.869|4.543,7.869|4.543..."/>
  <path fill="#FFFFFF" stroke="#FF3333"
    stroke-width="2"
    d="M415.291,325.381|4.543-
    7.869|4.543,7.869|4.543,7.869h..."/>
</g>
.....
</svg>
```

SYSTEM AND METHOD FOR MEASURING SVG DOCUMENT SIMILARITY

FIELD OF THE INVENTION

The present invention relates generally systems for Scalable Vector Graphics (SVG) documents. More particularly, the present invention relates to systems and methods for measuring the degree of similarity in SVG documents.

BACKGROUND OF THE INVENTION

Measuring a level or degree of similarity between objects can be very useful in many applications. Image similarity is performed based upon the images' inherent color and texture properties. 3D objects can be compared based on shape matching algorithms that consider topology and feature matching. Textual content can be matched by metrics ranging from a simple "diff" program to more advanced pattern matching and semantic grouping algorithms.

Although many systems and mechanisms are known for determining and measuring levels of similarity among XML documents, computing similarity among SVG documents is not nearly so simple. SVG content is based upon an underlying XML format. The fundamental difficulty with SVG documents that two given SVG documents with a very similar underlying XML representation may have completely different visual representations when rendered, and vice-versa. FIGS. 1(a) and 1(b) exemplify this issue. Although the two SVG documents in FIGS. 1(a) and 1(b) look identical, their underlying textual representations are quite different from one another. In particular, FIG. 1(a) makes use of <defs> and <use> elements for predefining the shapes and reusing them with different colors and positions. FIG. 1(b), on the other hand, renders each shape separately without reusability. If a system relies on traditional document comparison methods to determine the similarity between these documents, the documents might be classified as being vastly different. In addition, traditional pixel-based methods for determining levels of similarity are not optimal, as one would have to convert the SVG-rendered content into raster graphics, and the process becomes even more complicated when animations are involved.

FIGS. 2(a) and 2(b), on the other hand, show a situation where the SVG textual contents are similar to one another, but the documents themselves possess very different visual appearances. The only difference between the two documents in terms of the underlying SVG text is "style="visibility: hidden." However, this small difference makes the ultimate images look quite different visually.

Although SVG is considered a promising XML-based language for 2D graphics, potentially opening up a whole host of possibilities for new consumer and enterprise services, there has thus far been relatively little progress in optimizing SVG in these different applications.

Several methods and tools have been previously developed for computing similarity among XML documents. For example, one tool called "XML Diff" detects structural changes in the XML sub-trees and produces a Diffgram to describe the differences between the two sub-trees. A second method involves the use of a matching algorithm for measuring the structural similarity between an XML document and a DTD. A third approach involves linearizing the structure of each XML document by representing it as a numerical sequence, and then comparing the sequences through the analysis of their frequencies. A fourth approach involves a structural similarity metric for XML documents based upon an "XML aware" edit distance between ordered labeled trees to cluster documents by DTD. A fifth method measures similarity between vectors after representing documents based upon their structure in vector form. This method is used to obtain the measure of structural similarity between two given documents and is discussed in United States Application Publication No. 2005/0038785. However, none of these systems focus on the problem of differences in the underlying content and the visual representation, as XML by itself is not visual and SVG is a special form of XML content.

In addition to the above, there are also several methods for compressing XML content based upon certain optimizations for removing redundant patterns. One such system involves a new XML compression scheme that is based upon the Sequitur compression algorithm to remove excessive information redundancy in its representation. By organizing the compression result as a set of context free grammar rules, the scheme supports processing of XPath queries without decompression. Another approach involves a tool for compressing XML data, with applications in data exchange and archiving, which usually achieves about twice the compression ratio of gzip at roughly the same speed. The compressor, referred to as XMill, incorporates and combines existing compressors in order to apply them to heterogeneous XML data. XMill uses zlib, the library function for gzip, a collection of datatype specific compressors for simple data types, as well as user-defined compressors for application specific data.

SUMMARY OF THE INVENTION

The present invention provides an improved process of determining whether any two given SVG documents are visually similar, as well as determining the degree of similarity and the nature of similarity between the documents. The present invention introduces a mechanism for converting individual SVG documents into their minimal logical representations based upon certain SVG optimization heuristics. The similarity of these logical representations is then computed on the representations' reduced logical DOM trees. Tree isomorphism is useful to determine how similar tree structures are with respect to one another. Several metrics, such as the maximum common sub-tree and tree distance measurement, can be used to determine the maximum number of common nodes between two given trees. The larger the maximum common sub-tree is, the more similar are the two trees.

The approach of the present invention for reducing SVG to its minimal logical form is different from the XML compression methods discussed above in that the minimal representation is computed in a substantially different manner with the present invention. Additionally, unlike the compression based methods discussed previously, the minimal logical SVG form is still uncompressed and is capable of still being rendered using the system and method of the present invention.

The present invention is capable of vastly improving and even optimizing SVG's performance, so that the underlying logical representations that comprise large datasets of SVG content can be modified, updated or traversed more efficiently based upon the computed similarity information. The present invention is also unique in that it concerns SVG-type content where both the underlying XML representation and its visual appearance need to be considered before actually computing a degree of similarity. In addition, present invention provides new techniques for computing a minimal logical representation of the SVG document, computing the similarity by applying tree isomorphism on the normalized SVG trees and representing this similarity information.

The system and method of the present invention can be applied to various use cases particularly relevant to the mobile devices community. In a streaming scenario, this similarity information allows the client to be more discrete about whether or not to use the arriving packet of data for reconstructing a scene graph. Furthermore, the client may be able to repair its existing scene graph based on information provided in the RTP payload header rather than destroying the entire scene graph and reconstructing a new one. In a content search scenario, similar SVG documents can be retrieved based upon either an example SVG document or by a query of keywords. This facilitates more efficient and intelligent content search applications. In a compression scenario, by observing intra-document similarity, redundant information within a given SVG document can be removed by merely storing the element ID instead.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIGS. 1(a) and 1(b) show examples of two SVG documents that appear graphically similar, but the underlying textual representations are vastly different;

FIG. 2(a) and 2(b) show examples of two SVG documents that appear graphically different, but the underlying textual representations are similar;

FIG. 4 demonstrates an example of resolving attributes while computing a minimal logical representation from a SVG document;

FIG. 5 shows an example of ignoring less important information while computing a minimal logical representation;

FIG. 6 shows an example of two SVG documents sharing some similar content between them;

FIG. 7 shows an example of two SVG documents sharing some similar structure between them;

FIG. 8 shows an example of two SVG documents sharing similar content as well as structure between them;

DETAILED DESCRIPTION OF THE PREFERRED EMBODIMENTS

The present invention provides a system and method for reducing SVG documents to their minimal logical DOM tree structure in order to avoid the problem of disparity between the visual and underlying textual representations of each document. The present invention then applies similarity metrics based on tree isomorphism to compute the degree of similarity between the SVG documents. The present invention can be used in applications such as streaming, content searching, and compression. Each of these use cases is discussed below.

Figure 11:
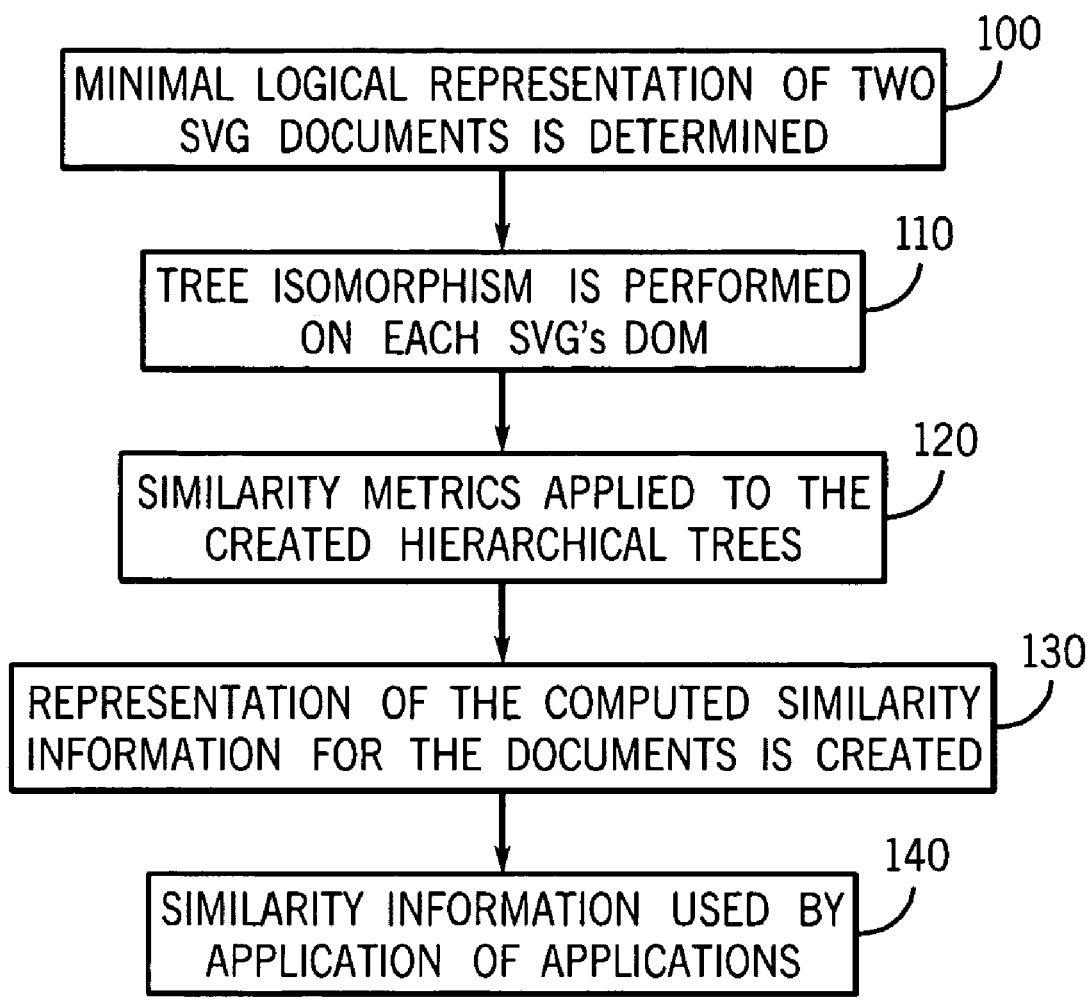
FIG. 11 is a flow chart showing a process for implementing one embodiment of the present invention.

A process for computing similarity between the SVG samples according to the present invention is depicted in FIG. 11. At step 100, a minimal logical representation of two SVG documents is determined. At step 110, tree isomorphism is performed on each SVG's Document Object Model (DOM). At step 120, the system applies similarity metrics to the created hierarchical trees for each document. At step 130, a representation of the computed similarity information for the two documents is created. This information can then be used in by one of several applications at step 140. Each of these process portions is discussed below.

Figure 3:
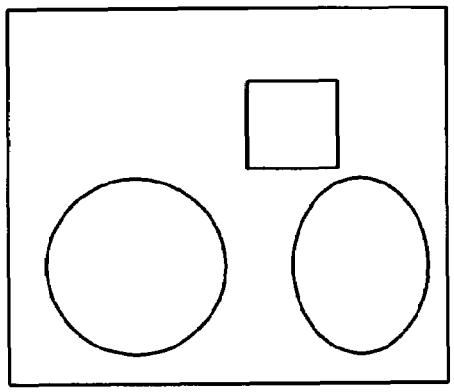
FIG. 3 shows the conversion of the underlying textual representation of a SVG document into a minimal logical representation by ignoring redundant, unreferenced and unused SVG elements.

The determining of a minimal logical representation of a SVG document involves four different sub-processes in one embodiment of the invention. The first sub-process involves collapsing the document. Redundant, unreferenced and unused SVG elements and comments are ignored. This sub-process is applied in order to remove elements that do not contribute to the visual representation of the SVG document. The document may often contain element definitions within the <defs> block that are not rendered or may be set to invisible. Such elements can be removed before comparing the document at issue to other SVG documents. This collapsing sub-process is depicted in FIG. 3, where comments and an instruction with a "visibility:hidden" setting are removed.

A second sub-process involves "substitution." This sub-process applies to expanding internal references and definitions within the SVG document, resolving references and resolving relative URLs to absolute URLs for the sake of fairer comparison. As seen in FIG. 1, <defs> and <use> elements are meant for the reusability of element definitions and can be used as many times as one desires in the SVG document. If there is a <use> element, the used content gets cloned and virtually appended to the <use> element. This cloned content is a "shadow tree" of the original element that gets "<use>ed." Substitution involves expanding the element definition inline where a <use> element is mentioned. This can be done in order to accurately compare the document with another visually similar SVG document that does not use <defs> and <use> elements, for example.

The third sub-process in creating a minimal logical representation involves resolving attributes. Often, even if references are properly substituted from the <defs> block and the same element id is used with 'xlink:href', the attributes in the documents might be different. This can lead to significant variations in the visual representation. For example, in SVG animations, changes in height, width, begin time, etc. may lead to completely different visuals at a particular timestamp. One such example is depicted in FIG. 4. In this scenario, even though both documents use the same animate definition, the attributes in the actual animation are different, as indicated in the corresponding visual representations at a two second mark. As the first animation starts one second earlier than the second animation, the rectangle has already changed color from purple to yellow by the two-second mark.

The fourth sub-process in creating a minimal logical representation involves ignoring less significant differences. Individual elements or attributes in SVG often may not be as important as other elements or attributes. For example, differences in font styles and size may be ignored when computing similarity for use in certain applications. Additionally, SVG embeds other media such as raster images, audio and video. These elements would require audio/video similarity metrics to be applied separately to them in addition to computing SVG similarity, or they can simply be ignored depending upon the particular application or system. In the example shown in FIG. 5, the two SVG documents are visually similar, except that the word 'Hello' is larger in the first image when compared to the second image. Looking at the textual representations, one can see that the font sizes vary. Depending upon the application, this may not be very important and, when creating the minimal logical representation, the 'font-size' attribute can be ignored if the application so permits.

Step 110 in FIG. 11 involves Tree Isomorphism on each SVG's Document Object Model (DOM). In SVG, the elements are rendered in the order in which they appear in the scene graph or Document Object Model (DOM). Each element in the data format can be thought of as a canvas on which paint is applied. If objects are grouped together with a <g> tag, they are first rendered as a separate group canvas, then composited on the main canvas using filters or alpha masks associated with the group. The underlying SVG definitions are laid out in an XML-like node-labeled tree structure. In other words, the DOM can be viewed as a directed acyclic tree, allowing traversal of the nodes of the tree that constitute the various SVG elements.

Two given trees are generally considered to be isomorphic if one tree can be transformed into the other by simply renaming nodes. A SVG document tree T can be defined as a 4 tuple T=(N, r, E, L), where N is a finite set of nodes; r=root(T) belonging to N is the root node '<svg>'; E is an edge and therefore a binary relation on $N^2$; and L defines a string representing an element name or attribute as defined in SVG 1.2, which can be found at http://www.w3.org/TR/SVG12/.

In order for two SVG trees T1 and T2 to be isomorphic, there needs to be a 1-1 mapping f: V1->V2 such that {v,w} is an edge in E1 if and only if {f(v), f(w)} is an edge in E2. Also, T1 and T2 represent the minimal logical representations of the two SVG documents.

Step 120 in FIG. 11 involves applying similarity metrics. One can apply different similarity metrics that are used for computing hierarchical tree similarity. The present invention can use any of the following metrics while still providing superior performance.

(1) If A and B are two logically minimized SVG DOM trees, the set operation ∩ (intersection) can be defined. This operation denotes a SVG sub-tree common to both trees A and B. The cardinality (|T|) of a SVG DOM tree is the number of nodes (SVG elements) in a tree T. A percentage measure of similarity can be given by:

$S1=|A \cap B|/|A|*100$ $S2=|A \cap B|/|B|*100$ (2) Tree Distance Measurements: In this example, A and B are two logically minimized SVG DOM trees, D(A, B) is their tree edit distance (i.e., the number of nodes that are different) and Cost(A,B) is the cost to delete the different nodes in A and insert the new nodes from B. The tree distance measure S between A and B is then defined as S(A, B)=D(A,B)/Cost(A, B). The S(A,B) is low when the SVG documents are similar with a high percentage of matching nodes and high with low percentage of matching nodes when they are very different. In this scenario, the value ranges between 0 and 1.

The similarity between any two minimal logical SVG scene graphs can be characterized based on three categories: Content similarity, structural similarity, and positional content similarity.

Content similarity involves determining the common content intersection between two logical SVG scene graphs. The equality of contents in two given SVG scene graphs is analogous to sub-string matching. For example, the two SVG scene graphs illustrated in FIG. 6 share some common road sign symbol definitions. A fragment of the common SVG content shared between the two SVG documents is provided below the scene graphs.

Structural similarity involves determining the common structural intersection between two logical SVG scene graphs. Structurally similar SVG scene graphs have the similar tree hierarchies, i.e. they share some common elements and children of elements. However, the attributes of the common elements might be different. In FIG. 7, the documents have some structural similarity, but the icons in each of the documents have different attributes and IDs. For example, the first SVG document has icon elements define weather symbols, and the second SVG document has the icon elements define road signs. Additionally, the fill color attributes for various elements in the two files are different. However, the two documents do have a similar underlying map structure with road connectors and cities.

Positional content similarity involves the consideration of content as well as position. Positional content similarity is a measure of the common content positioned in the common structure and is most suitable for determining SVG packet similarity while streaming, as it provides the most information. The higher the percentage of positional content similarity between two SVG scene graphs, the more identical the SVG scene graphs are to each other. In FIG. 8, both SVG documents/scene graphs are positionally similar with the map layout in consideration. However, SVG Document B has a zooming capability on one region of the map.

Step 130 in FIG. 11 involves the creation of a representation of the computed similarity information. While the similarity metrics inform the user the type of similarity and how similar the SVG scene graphs are to one another, the similarity information tells the user what is similar. For example, in a streaming scenario, if the positional content similarity between two SVG samples is >80%, then the streaming server can choose to transmit the similarity information to the client. The client can then modify the scene graph based upon this incoming similarity information.

SVG is XML-based, and the similarity information between two SVG scene graphs can be intuitively represented using node positions in the SVG scene graph. The syntax grammar that can be used to specify node positions for SVG similarity information, is defined as follows:

Specifying the node →'/' Node Position '/' . . . where '/' means "child of". Range of nodes →Node Position '-' Node Position Using an example, /1/2/3-6→means the third, fourth, fifth and sixth child of the second child of the first node starting at the root <svg> level.

Step 140 in FIG. 11 involves having various applications use the generated similarity information. Three such applications are discussed herein. However, it is also possible for other applications to be capable of using the generated similarity information of the present invention.

Streaming. SVG content has the capability of providing a framework for audio and video content and can be streamed across a network to many clients at a given time. As streaming itself does not promise residency in data delivery, one of several error correction mechanisms includes retransmission of the same sample at specific time intervals, as long as it is temporally valid in the presentation. In order to ensure that a client receives the SVG scene relevant at a particular time instant, the streaming server transmits the current SVG scene at regular intervals until it becomes temporally invalid.

A problem arises when a client rendering a current SVG scene receives the same packet, destroys its existing-scene graph, and reconstructs it again with the new packet. This leads to severe optimization problems on the client side when it repeatedly destroys and reconstructs the SVG scene at regular intervals. There has been no conventional solution for determining similarity between SVG samples while streaming, and no information has been provided in the real-time transport protocol (RTP) payload format to do so. By providing an effective method for comparing two adjacent samples of the SVG media content while streaming, this information can be specified as a new unit in the RTP payload header. The client, upon receiving a sample, can therefore simply read this information from the header and choose to destroy its existing scene graph if the new sample is different.

In a streaming scenario, the similarity information itself can either be used to dynamically update the SVG DOM on the client by using update syntax in the form of add, delete, or replace operations sent by the server. The streaming server can send information in the RTP packet with similarity or dissimilarity. Based upon the similarity between packets, the positions in the client's DOM can be dynamically modified. This optimizes the client's performance by minimizing the number of reconstructions of the DOM, and just repairing or modifying the DOM tree. It should be noted that if the SVG scene graphs being compared are very similar, it may be more optimal to send dissimilarity information rather than similarity information. The scene update instructions are as follows.

SetAttribute: This element is used to update attributes of the scene specified by the target element (xlink:href). The attributeName and attribute values correspond to attribute and value of the target element to be added or replaced.
<SetAttribute attributeName="x" attributeValue="10" attributeType="CSS/XML/auto" xlink:href="#myRect"/>

AddElement: This element is used to update the scene with a new element (myCircle) as a child of the specified parent element (xlink:href). If insertBefore is specified, the new element is inserted before this element.
<AddElement xlink:href="#Scene1" insertBefore="#myRect">
  <circle id=myCircle" cx="20" cy="20" r="50" fill="yellow"/>
</AddElement>

DeleteElement: This element is used to delete the specified element (href) from the scene or DOM object model.
</DeleteElement xlink:href="#myRect"/>

This update is ignored if the element specified in the syntax does not exist. Also, if the element under contention happens to have children, the entire sub-tree is removed from the client's memory. However, only the element is deleted if it is a leaf node.

ReplaceElement: This element is used to replace an existing element (xlink:href) from the scene with a new element (myCircle). This operation is essentially in-order combination of DeleteElement and AddElement.

<ReplaceElement xlink:href="#myCircle">
  <ellipse id="myEllipse" cx="40" cy="35" rx="110" ry="60" fill="blue"/>
</ReplaceElement>

In addition, node positions relative to the root can be used for the above update operations if attribute names are not provided for the SVG elements. Examples for the various update operations using relative node positions are:
<SetAttribute attributeName="x" attributeValue="10" attributeType="CSS/XML/auto" position="/1/5-6"/>

This command updates the attributes of the fifth and sixth child nodes of the first child starting at the root level.
<AddElement xlink:href="#Scene1" insertBefore="/2/6">
  <circle id=myCircle" cx="20" cy="20" r="50" fill="yellow"/>
</AddElement>

The above command adds a new element before the sixth child node of the second child starting at the root level.
<DeleteElement position="/3/1"/>

The above command deletes the first child of the third node starting at the root level.
<ReplaceElement xlink:href=/3/4/2">
  <ellipse id="myEllipse" cx="40" cy="35" rx="110" ry="60" fill="blue"/22

The above command replaces the second child of the fourth child node of the third child node starting from the root level.

Figure 9A:
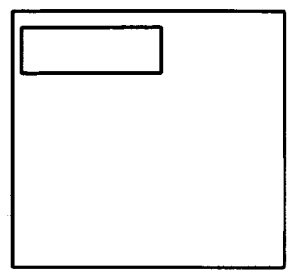
FIG. 9(a) presents a graphical depiction of an original SVG scene.
Figure 9B:
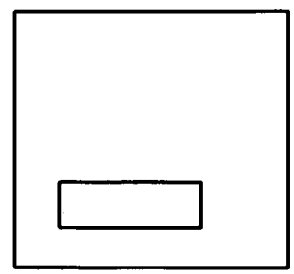
FIG. 9(b) shows the effect of a Scene Update: SetpdateAttribute action.
Figure 9C:
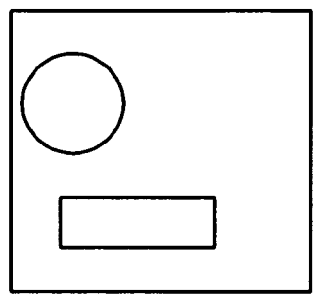
FIG. 9(c) shows the effect of a subsequent Scene Update: AddElement action.
Figure 9D:
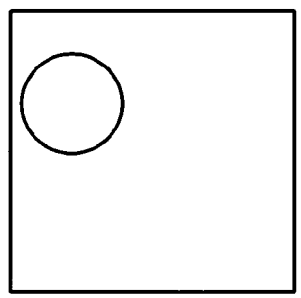
FIG. 9(d) shows the effect of a subsequent Scene update: DeleteElement action.
Figure 9E:
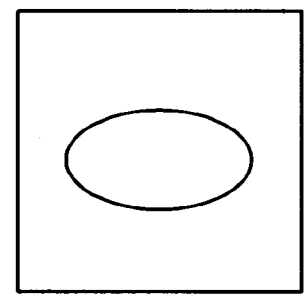
FIG. 9(e) shows the effect of a subsequent Scene update: ReplaceElement action.

FIGS. 9(a)-9(e) show SVG examples of various scene update operations. FIG. 9(a) shows an original SVG scene including a rectangle element"myRect." FIG. 9(b) shows the effect of using the "SetAttribute", which changes the position of the original element, "myrect." FIG. 9(c) shows the effect of the "AddElement" attribute, adding a new item, "myCircle," to the scene. FIG. 9(d) shows the effect of the "DeleteElement" attribute, deleting the "myrect" element from the scene. FIG. 9(e) shows the effect of the "ReplaceElement" attribute, in which a new item, "myCircle" replaces the previously existing item, "myEllipse.".

Content Searching. Unlike traditional raster graphics, SVG has an underlying XML syntax, thus making search tasks relatively more straightforward. With the growing applicability of SVG for generating weather maps, traffic information and entertainment, the corpus of SVG documents is only increasing. Faster and more efficient retrieval techniques are therefore imperative. Content searching by example and content searching by keywords are two frameworks that can greatly benefit from the SVG similarity computation system of the present invention. Furthermore, with the ensuing popularity of SVG as a web-based vector graphics language, search engines can be extended to include searching for SVG documents as well.

SVG documents can be queried on a few search engines such as Google. However, such searches are mainly based off of the name of the SVG file and the context surrounding it. Harnessing the similarity information and being able to prioritize parts of the SVG document with some importance attributes can result in a more intelligent search mechanism.

Figure 10:
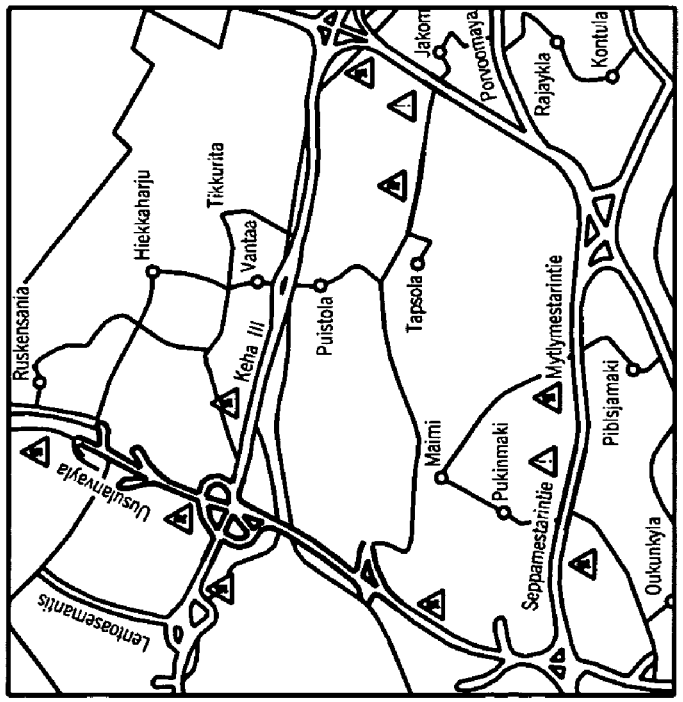
FIG. 10 is representation showing the assigning of importance weights to individual pieces of content in a SVG document.

An example of assigning such information is shown in FIG. 10. In this case, importance weights are normalized and range from 0 to 1, with 1 being most important. Documents can therefore be searched, where relevance is based on searching the most important parts of the SVG document. The internal query for searching documents can be of the form:
Specifying the node →'/'Node Position '/' . . . where '/' means 'child of'.

Compression. Considerable effort has been made to make SVG file sizes as small as possible while still retaining the benefits of XML and achieving compatibility and leverage with other World Wide Web Consortium (W3C) specifications. SVG documents have an XML-like structure and contain repeated and redundant information. By observing intradocument similarity, more optimization can be made while encoding SVG by searching for similarities in the DOM structure and eliminating redundant information.

Like any textual markup language, SVG is often verbose. There is a great deal of "redundant" data in a SVG document, including white space, comments and element and attribute names as pointed out previously. SVG documents are therefore an ideal candidate for compression. By extending the normalization of the SVG documents into their minimal logical representation, a new set of compression algorithms may be developed for SVG.

The following are several examples of alternative implementations of the present invention. In one such implementation, the step of determining a minimal logical representation of two SVG documents can include the application of other SVG rules in order to achieve a minimal logical representation based upon the application or system being used.

In another implementation, the concept of SVG tree isomorphism may be applied on different varieties of SVG trees, such as normalized trees or the complete versions. In an additional embodiment, variations in the notations of the parameters used in computing isomorphism may be used.

In another embodiment of the present invention, other commonly used similarity metrics can be applied on hierarchical trees. Along the same lines there may be other variations in similarity categories at the step of applying similarity metrics to the created hierarchical trees for each document.

In yet another embodiment of the invention, there may be variations in syntax as to how individual elements are accessed in the DOM tree. The scene update syntax may also include variations for the streaming scenario depending upon the client and server used and the application itself. Lastly, modifications can be made to how the SVG minimal logical representation, tree isomorphism and similarity metrics are computed in search and compression scenarios. All of the above embodiments and implementations can also be combined as necessary or desired to meet system and application requirements.

Figure 12:
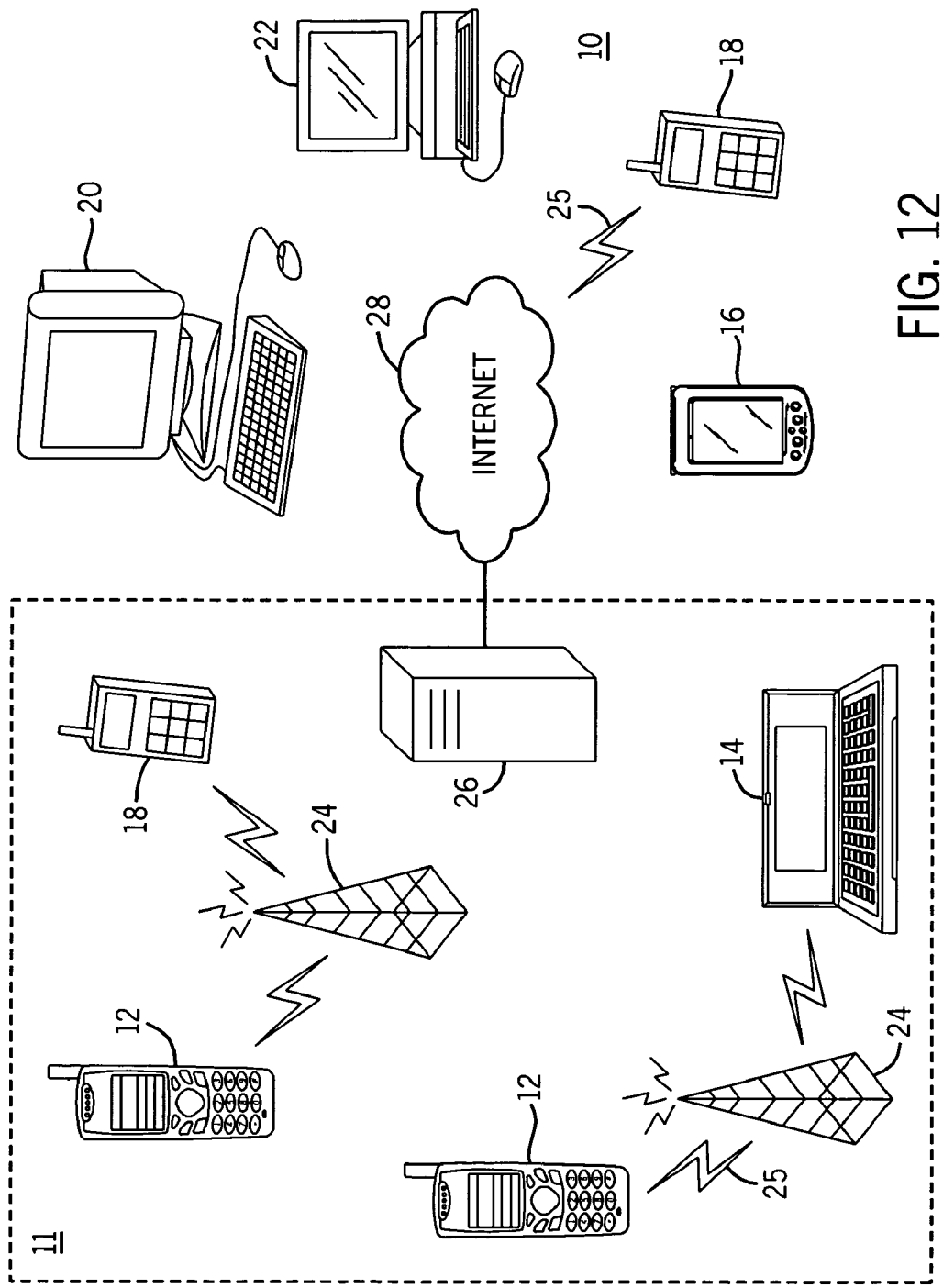
FIG. 12 is an overview diagram of a system within which the present invention may be implemented.

FIG. 12 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 12 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 13:
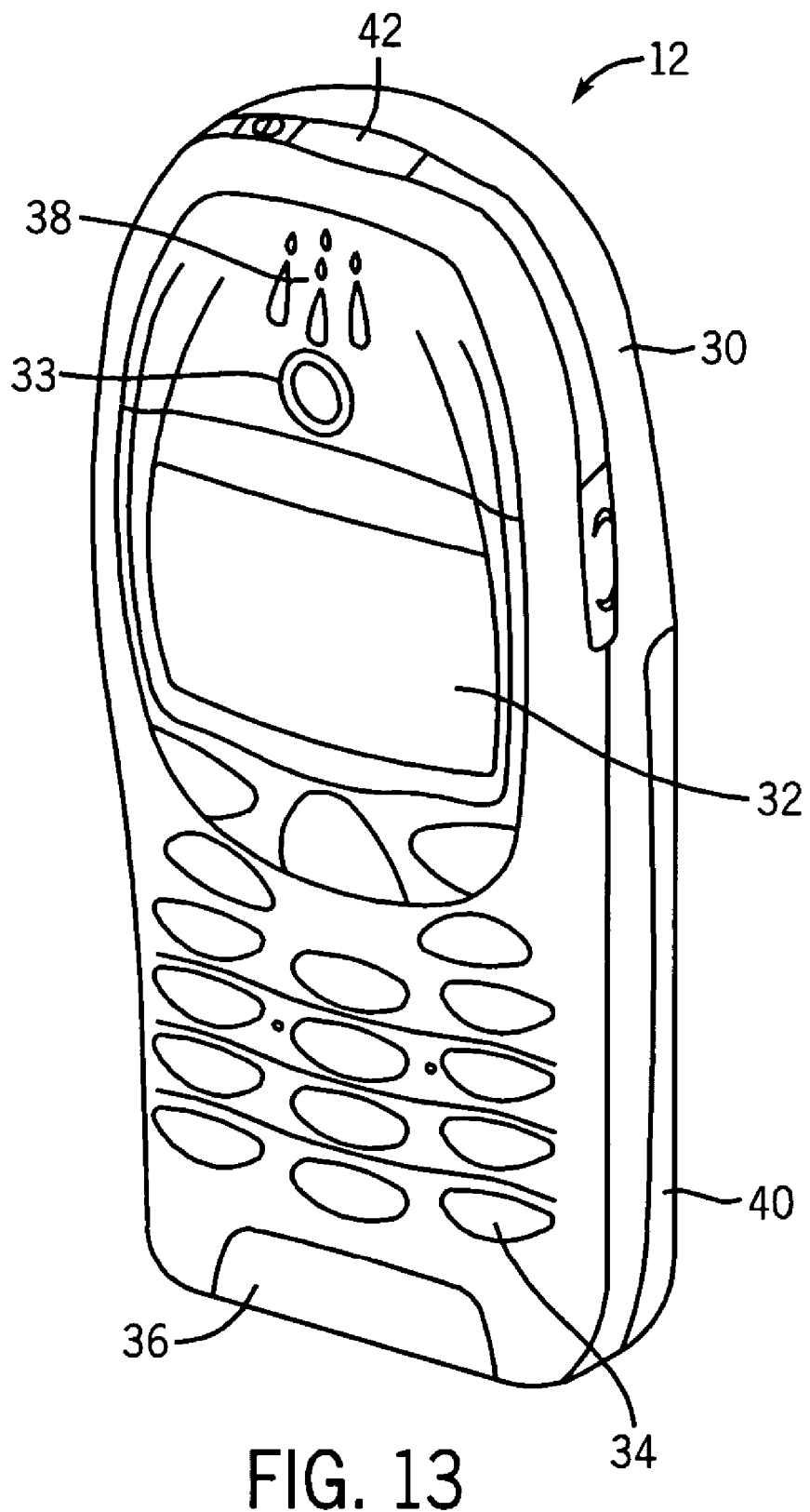
FIG. 13 is a perspective view of an electronic device that can incorporate the principles of the present invention.
Figure 14:
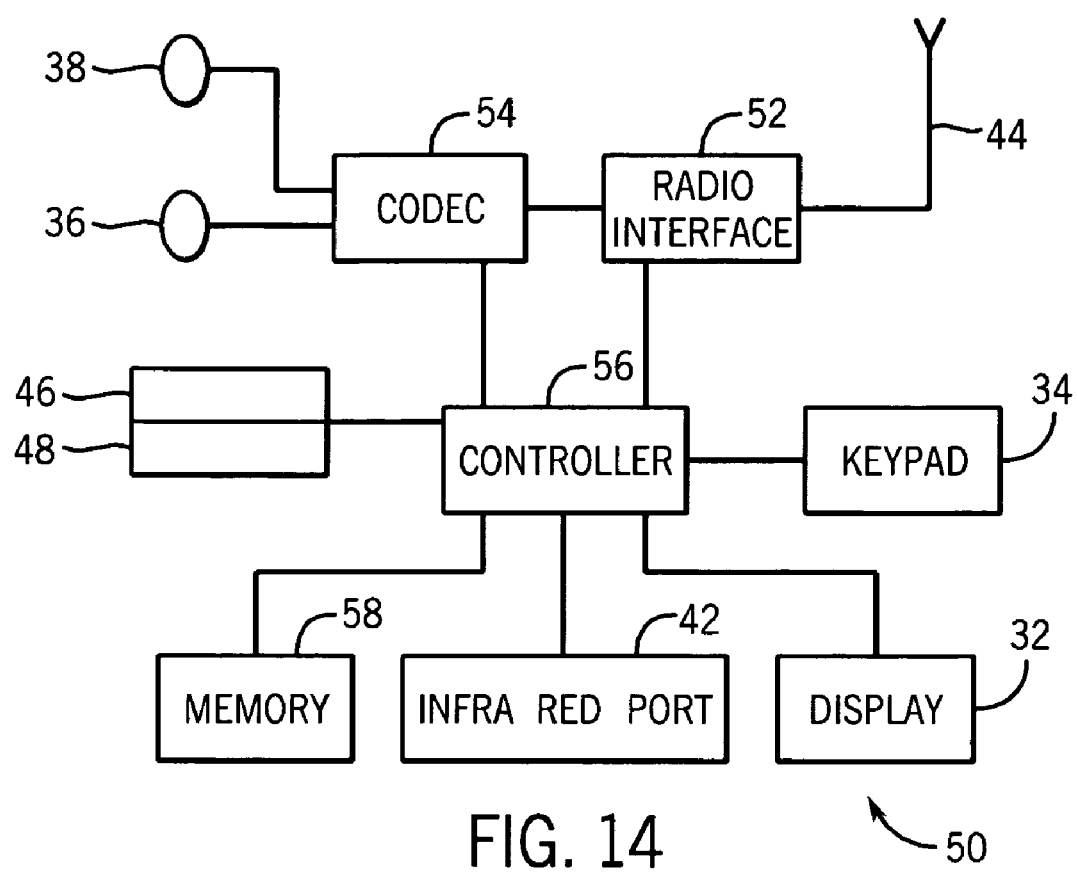
FIG. 14 is a schematic representation of the circuitry of the electronic device of FIG. 13.

FIGS. 13 and 14 show one representative mobile telephone 12 within which the present invention may be implemented. It should be understood, however, that the present invention is not intended to be limited to one particular type of mobile telephone 12 or other electronic device. The mobile telephone 12 of FIGS. 13 and 14 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of comparing Scalable Vector Graphics (SVG) documents, comprising:
   creating a minimal logical representation of a first SVG document;
   performing tree isomorphism on the minimal logical representation of the first SVG document's document object model (DOM) to create a first logically minimized SVG DOM tree;
   using a similarity metric to compare the first logically minimized SVG DOM tree with a second logically minimized SVG DOM tree for a second SVG document; and
   creating a representation of computed similarity information from the comparison of the first logically minimized SVG DOM tree and the second logically minimized SVG DOM tree.

2. The method of claim 1, further comprising transmitting information regarding the representation in a streaming application.

3. The method of claim 2, wherein the transmitted information includes pieces of information selected from the group consisting of information concerning the update of an attribute in a scene; information concerning the addition of an element to a scene; information concerning the deletion of an element from a scene; information concerning the replacement of an element in a scene; and combinations thereof.

4. The method of claim 1, further comprising using the created representation in a compression application.

5. The method of claim 1, further comprising using the created representation in a content searching application.

6. The method of claim 1, wherein the creation of the minimal logical representation of the first SVG document includes removing at least one redundant, unreferenced or unused SVG element or comment in the first SVG document.

7. The method of claim 1, wherein the creation of the minimal logical representation of the first SVG document includes performing at least one action selected from the group consisting of expanding at least one internal reference, expanding at least one definition, resolving at least one reference, resolving at least one relative URL to an absolute URL, and combinations thereof, in the first SVG document.

8. The method of claim 1, wherein the creation of the minimal logical representation of the first SVG document includes resolving at least one attribute within the first SVG document.

9. The method of claim 1, wherein the use of the similarity metric includes using an intersection between the first logically minimized SVG DOM tree and the second logically minimized SVG DOM tree to create a percentage measurement of similarity.

10. The method of claim 1, wherein the use of the similarity metric includes defining a distance measurement between the first logically minimized SVG DOM tree and the second logically minimized SVG DOM tree.

11. The method of claim 1, wherein the similarity metric is used to measure the content similarity, the structural similarity, and the positional content similarity between the first logically minimized SVG DOM tree and the second logically minimized SVG DOM tree.

12. A computer program product embodied in a memory, for comparing SVG documents, comprising:
    computer-executable instructions for creating a minimal logical representation of a first SVG document;
    computer-executable instructions for performing tree isomorphism on the minimal logical representation of the first SVG document's document object model to create a first logically minimized SVG DOM tree;
    computer-executable instructions for using a similarity metric to compare the first logically minimized SVG DOM tree with a second logically minimized SVG DOM tree for a second SVG document; and
    computer-executable instructions for creating a representation of computed similarity information from the comparison of the first logically minimized SVG DOM tree and the second logically minimized SVG DOM tree.

13. The computer program product of claim 12, wherein the creation of the minimal logical representation of the first SVG document includes removing at least one redundant, unreferenced or unused SVG element or comment in the first SVG document.

14. The computer program product of claim 12, wherein the creation of the minimal logical representation of the first SVG document includes performing at least one action selected from the group consisting of expanding at least one internal reference, expanding at least one definition, resolving at least one reference, resolving at least one relative URL to an absolute URL, and combinations thereof in the first SVG document.

15. The computer program product of claim 12, wherein the creation of the minimal logical representation of the first SVG document includes resolving at least one attribute within the first SVG document.

16. The computer program product of claim 12, wherein the use of the similarity metric includes using an intersection between the first logically minimized SVG DOM tree and the second logically minimized SVG DOM tree to create a percentage measurement of similarity.

17. The computer program product of claim 12, wherein the use of the similarity metric includes defining a distance measurement between the first logically minimized SVG DOM tree and the second logically minimized SVG DOM tree.

18. An electronic device, comprising:
    a processor; and
    a memory unit operatively connected to the processor and including:
        computer code for creating a minimal logical representation of a first SVG document,
        computer code for performing tree isomorphism on the minimal logical representation of the first SVG document's document object model to create a first logically minimized SVG DOM tree,
        computer code for using a similarity metric to compare the first logically minimized SVG DOM tree with a second logically minimized SVG DOM tree for a second SVG document, and
        computer code for creating a representation of computed similarity information from the comparison of the first logically minimized SVG DOM tree and the second logically minimized SVG DOM tree.

19. The electronic device of claim 18, wherein the creation of the minimal logical representation of the first SVG document includes removing at least one redundant, unreferenced or unused SVG element or comment in the first SVG document.

20. The electronic device of claim 18, wherein the creation of the minimal logical representation of the first SVG document includes performing at least one action selected from the group consisting of expanding at least one internal reference, expanding at least one definition, resolving at least one reference, resolving at least one relative URL to an absolute URL, and combinations thereof, in the first SVG document.

21. The electronic device of claim 18, wherein the use of the similarity metric includes using an intersection between the first logically minimized SVG DOM tree and the second logically minimized SVG DOM tree to create a percentage measurement of similarity.

22. The electronic device of claim 18, wherein the use of the similarity metric includes defining a distance measurement between the first logically minimized SVG DOM tree and the second logically minimized SVG DOM tree.

* * * * *